(12) United States Patent
Cheshire

(10) Patent No.: US 7,532,862 B2
(45) Date of Patent: May 12, 2009

(54) METHOD AND APPARATUS FOR CONFIGURING A WIRELESS DEVICE THROUGH REVERSE ADVERTISING

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1223 days.

(21) Appl. No.: 10/102,321

(22) Filed: Mar. 19, 2002

(65) Prior Publication Data

US 2003/0181203 A1 Sep. 25, 2003

(51) Int. Cl.
  *H04B 7/00* (2006.01)
  *H04K 1/00* (2006.01)
  *G06F 15/177* (2006.01)
  *G06F 15/16* (2006.01)

(52) U.S. Cl. ............ 455/41.2; 709/221; 709/222; 709/228; 709/249; 380/270

(58) Field of Classification Search ............ 455/41.2, 455/420; 380/270; 709/221, 222, 228, 249
See application file for complete search history.

(56) References Cited

U.S. PATENT DOCUMENTS

| | | | | |
|---|---|---|---|---|
| 5,852,744 A * | 12/1998 | Agatone et al. | ............ | 710/17 |
| 5,960,167 A * | 9/1999 | Roberts et al. | ............ | 358/1.15 |
| 6,026,297 A * | 2/2000 | Haartsen | ............ | 455/426.1 |
| 6,259,405 B1 * | 7/2001 | Stewart et al. | ............ | 342/457 |
| 6,519,460 B1 * | 2/2003 | Haartsen | ............ | 455/452.1 |
| 6,691,173 B2 * | 2/2004 | Morris et al. | ............ | 709/249 |
| 6,732,176 B1 * | 5/2004 | Stewart et al. | ............ | 709/227 |
| 6,788,938 B1 * | 9/2004 | Sugaya et al. | ............ | 455/435.1 |
| 6,891,820 B1 * | 5/2005 | Pham et al. | ............ | 370/338 |
| 6,894,994 B1 * | 5/2005 | Grob et al. | ............ | 370/335 |
| 6,950,666 B2 * | 9/2005 | Asakawa | ............ | 455/503 |
| 6,965,948 B1 * | 11/2005 | Eneborg et al. | ............ | 709/250 |
| 6,981,259 B2 * | 12/2005 | Luman et al. | ............ | 718/103 |
| 6,993,570 B1 * | 1/2006 | Irani | ............ | 709/218 |
| 7,069,344 B2 * | 6/2006 | Carolan et al. | ............ | 709/250 |
| 7,107,442 B2 * | 9/2006 | Cheshire | ............ | 713/1 |
| 7,170,857 B2 * | 1/2007 | Stephens et al. | ............ | 370/230 |
| 7,184,774 B2 * | 2/2007 | Robinson et al. | ............ | 455/452.1 |
| 7,191,236 B2 * | 3/2007 | Simpson-Young et al. | ............ | 709/228 |
| 7,246,225 B2 * | 7/2007 | Cheshire | ............ | 713/1 |
| 2001/0055950 A1 * | 12/2001 | Davies et al. | ............ | 455/41 |
| 2002/0051200 A1 * | 5/2002 | Chang et al. | ............ | 358/1.15 |
| 2002/0090089 A1 * | 7/2002 | Branigan et al. | ............ | 380/270 |

(Continued)

OTHER PUBLICATIONS

Publication entitled "Using a Unix computer as a 802.11 wireless base station," http://www.live.com/wireless/unix-base-station.html.

*Primary Examiner*—Fan Tsang
*Assistant Examiner*—Lisa Hashem
(74) *Attorney, Agent, or Firm*—Park, Vaughan & Fleming LLP

(57) ABSTRACT

One embodiment of the present invention provides a system that uses reverse advertising to configure a new wireless device to join an existing wireless network. During operation, the new wireless device broadcasts an advertisement for itself. In response to the advertisement, the new wireless device receives information from an existing wireless device on the existing wireless network. This information specifies how to join the existing wireless network. Next, the new wireless device uses the information to configure itself to join the existing wireless network.

28 Claims, 2 Drawing Sheets

U.S. PATENT DOCUMENTS

| | | | |
|---|---|---|---|
| 2002/0146981 A1* | 10/2002 | Saint-Hilaire et al. | 455/41 |
| 2003/0069800 A1* | 4/2003 | Marshall et al. | 705/26 |
| 2003/0182433 A1* | 9/2003 | Kulkarni et al. | 709/228 |
| 2004/0203376 A1* | 10/2004 | Phillipps | 455/41.2 |
| 2005/0180343 A1* | 8/2005 | Van Valkenburg | 370/310 |
| 2007/0141984 A1* | 6/2007 | Kuehnel et al. | 455/41.2 |
| 2007/0264991 A1* | 11/2007 | Jones et al. | 455/420 |

\* cited by examiner

| PACKET 200 | |
|---|---|
| NETWORK TO JOIN | 201 |
| KEY TYPE | 202 |
| KEY | 203 |
| IP ADDRESS | 204 |
| SUBNET MASK | 205 |
| IP GATEWAY ADDRESS | 206 |
| DNS SERVER ADDRESS | 207 |

METHOD AND APPARATUS FOR CONFIGURING A WIRELESS DEVICE THROUGH REVERSE ADVERTISING

BACKGROUND

1. Field of the Invention

The present invention relates to wireless networks for computer systems. More specifically, the present invention relates to a method and an apparatus that uses reverse advertising to configure a new wireless device to join an existing wireless network.

2. Related Art

Wireless networks provide an attractive alterative to convention wire-based computer networks. It is presently possible to equip a computing device with a low-cost wireless transceiver that enables the computing device to communicate through a wireless network. This avoids the expense and delay involved in running cable through a building to connect the computing device to a wire-based network. Moreover, the computing device can be easily moved to a new location within the building without having to reconfigure the network connection. Furthermore, a wireless network can be used to connect a portable computing device, such as a laptop computer or a personal organizer, to a computer network, without having to plug the portable computing device into a cable.

However, in order to communicate across a wireless network, a computing device must somehow be configured to join the wireless network. This can be a challenge because there may exist many wireless networks within transceiver range that a computing device can potentially join. The computing device can simply join the network with the strongest signal strength, but if there are lots of wireless networks within transceiver range, the computing device is likely to join the wrong network.

Furthermore, if the wireless network makes use of an encryption key for security purposes, the wireless device must somehow obtain the encryption key. It is not a problem to manually type in the encryption key if the computing device is a laptop computer with a keyboard and a display. However, if the computing device is a peripheral device, such as a printer, there may be no easy way to enter an encryption key (or other configuration information) into the computing device.

Hence, what is needed is a method and apparatus for configuring a computing device to join a wireless network without the above-described problems.

SUMMARY

One embodiment of the present invention provides a system that uses reverse advertising to configure a new wireless device to join an existing wireless network. During operation, the new wireless device broadcasts an advertisement for itself. In response to the advertisement, the new wireless device receives information from an existing wireless device on the existing wireless network. This information specifies how to join the existing wireless network. Next, the new wireless device uses the information to configure itself to join the existing wireless network.

In a variation on this embodiment, broadcasting the advertisement for the new wireless device involves advertising a new wireless network from the new wireless device, and then advertising the new wireless device on the new wireless network.

In a variation on this embodiment, advertising the new wireless device involves obtaining a link-local address for the new wireless device on the new wireless network.

In a variation on this embodiment, receiving the information from the existing wireless device on the existing wireless network involves: receiving a request to join the new wireless network from the existing wireless device; allowing the existing wireless device to join the new wireless network; and then receiving information from the existing wireless device specifying how to join the existing wireless network.

In a variation on this embodiment, allowing the existing wireless device to join the new wireless network involves obtaining a link-local address for the existing wireless device on the new wireless network.

In a variation on this embodiment, the new wireless device additionally receives an encryption key to facilitate secure communications across the existing wireless network. In a further variation, the new wireless device employs a Diffie-Hellman key exchange to ensure that the encryption key is received securely.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Devices

Figures 1, 2:
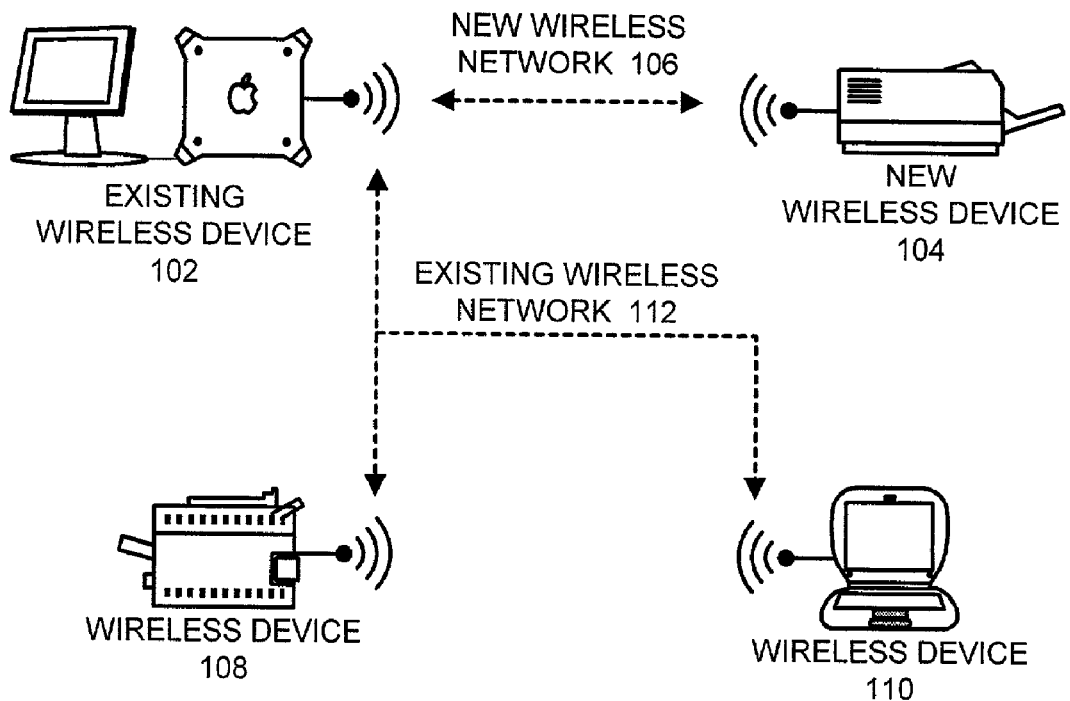
FIG. 1 illustrates a number of computing devices coupled together through wireless networks in accordance with an embodiment of the present invention.
FIG. 2 illustrates a packet containing configuration information to be used in configuring a new wireless device to join an existing wireless network in accordance with an embodiment of the present invention.

FIG. 1 illustrates a number of computing devices coupled together through wireless networks in accordance with an embodiment of the present invention. More specifically, FIG. 1 illustrates an existing wireless network 112, which couples together an existing wireless device 102 as well as other wireless devices 108 and 110. FIG. 1 also illustrates a new wireless network 106, which couples together new wireless device 104 and existing wireless device 102.

Wireless devices 102, 104, 108 and 110 can generally include any type of computer system, peripheral device or network appliance that can reside on a wireless computer network. They can include a computer system based on a microprocessor, a mainframe computer, a digital signal processor, a portable computing device, a personal organizer, a device controller, or a computational engine within an appliance. They can also include also peripheral devices, such as printers or storage devices, as well as input devices, such as cameras, microphones, keyboards or pointing devices, as well as output devices, such as displays or audio output devices. In the embodiment of the present invention illustrated in FIG. 1, existing wireless devices 102 is a personal computer, new wireless device 104 and wireless device 108 are printers, and wireless device 110 is a portable computer.

Existing wireless network 112 and new wireless network 106 can generally include any type of wireless communication channel through which computing devices can communicate. For example, they can include wireless networks that transmit information through infrared signals or radio frequency signals. Moreover, existing wireless network 112 and new wireless network 106 can include, but are not limited to, a local area wireless network, a wide area wireless network, or a combination of networks. In one embodiment of the present invention, existing wireless network 112 and new wireless network 106 can be used to communicate with the Internet.

During operation, new wireless device 104 initially communicates with existing wireless device 102 through new wireless network 106 in order to receive configuration information, which allows new wireless device 104 to join existing wireless network 112 as is described below with reference to FIGS. 2 and 3.

Configuration Information

FIG. 2 illustrates a packet 200 containing configuration information to be used in configuring new wireless device 104 to join existing wireless network 112 in accordance with an embodiment of the present invention. Note that packet 200 is sent by existing wireless device 102 to new wireless device 104 through new wireless network 106 as is discussed below with reference to FIG. 3.

Packet 200 includes a number of pieces of information that new wireless device 104 can use to communicate on existing wireless network 112. More specifically, packet 200 contains the name of a network to join 201. In the example illustrated in FIG. 1, this name identifies existing wireless network 112.

Packet 200 also includes a key type field 202, which identifies the type of encryption key used by the network. For example, the key type can specify that the encryption key is a Wired Equivalent Privacy (WEP) key or some other type of encryption key. Packet 200 also includes the encryption key 203 to be used in communicating on existing wireless network 112.

Packet 200 may additionally include standard information related to an Internet Protocol (IP) address for new wireless device 104. This information may include IP address 204, subnet mask 205, IP gateway address 206 and DNS server address 207. In the absence of such explicit IP configuration information, new wireless device 104 will typically use an IPv4 link-local address, or use a Dynamic Host Configuration Protocol (DHCP) server to obtain the necessary IP configuration information, or use the equivalent IPv6 capabilities.

Note that the above-specified information merely provides an example of possible configuration information. In other embodiments of the present invention, packet 200 can include more or less configuration information. In general, any other type of configuration information for new wireless device 104 can be included within packet 200.

Process of Joining an Existing Wireless Network

Figure 3:
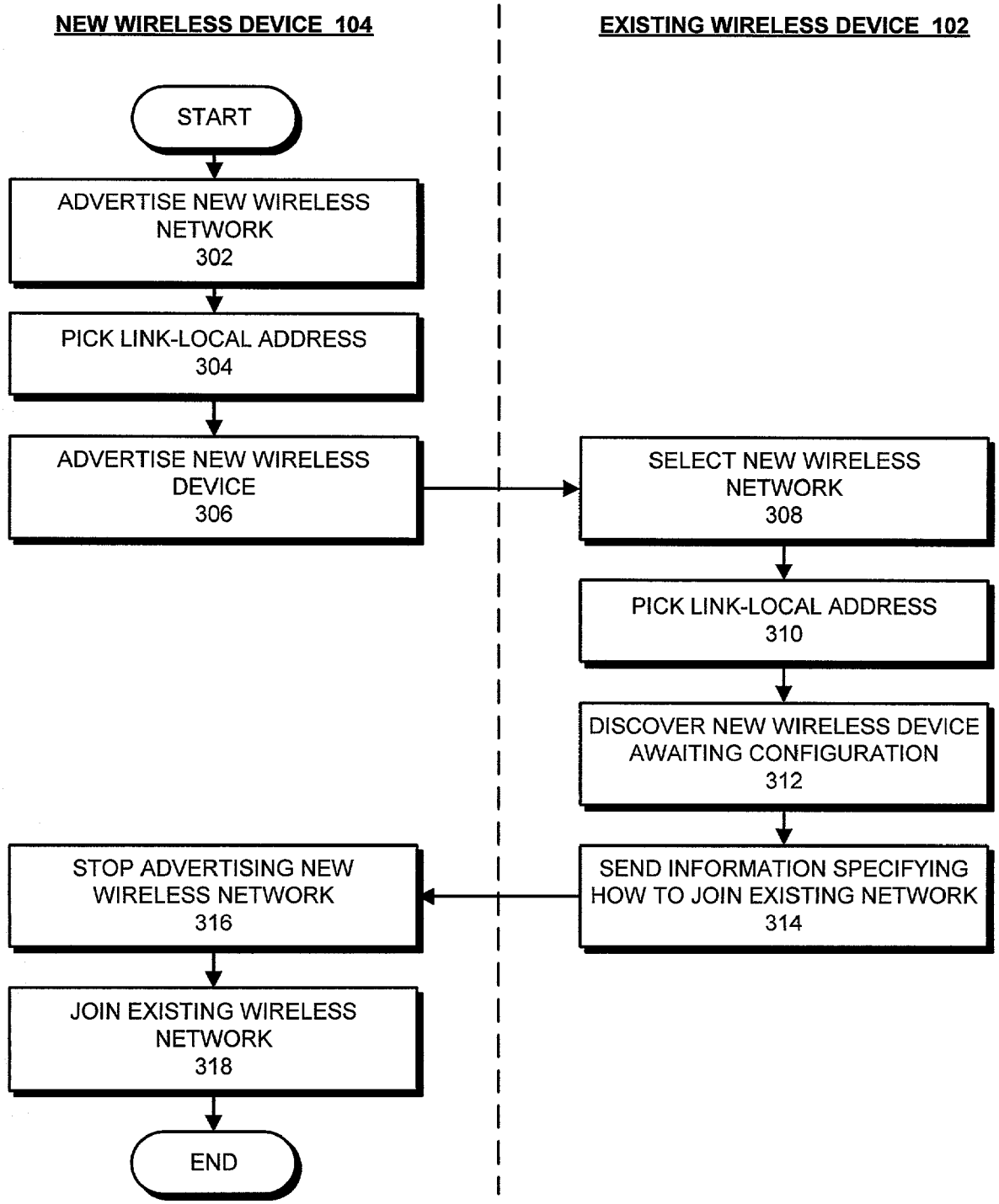
FIG. 3 presents a flow chart illustrating how a new wireless device joins an existing wireless network in accordance with an embodiment of the present invention.

FIG. 3 presents a flow chart illustrating how new wireless device 104 joins existing wireless network 112 in accordance with an embodiment of the present invention.

This process starts, for example, when a new wireless device 104, such as a printer, powers up. First, new wireless device 104 advertises a new wireless network 106 (step 302). In one embodiment of the present invention, new wireless device 104 offers a computer-to-computer (Independent Basic Service Set (IBSS)) network.

In one embodiment of the present invention, there is no DHCP server on new wireless network 106. Hence, new wireless device 104 picks itself a link-local address on new wireless network 106 (step 304).

Next, new wireless device 104 begins listening for incoming configuration packets, and creates a service advertisement announcing the fact that it is listening and ready for wireless configuration. This announcement can be made using DNS Service Discovery, or any other Service Discovery protocol known to those skilled in the art. If the announcement is made using DNS Service Discovery, and the official IANA name of the configuration protocol were "nwdcp" (for "new wireless device configuration protocol"), then new wireless device 104 would advertise a named instance of the service called "_nwdcp._udp.local.arpa."

New wireless device 104 may use its model number, serial number, or some other identifier, to differentiate new wireless device 104 from other wireless devices that may be seeking configuration information at the same moment in time.

At this point, existing wireless device 102 selects the new wireless network 106 (step 308). Note that this process can involve allowing a user of existing wireless device 102 to browse through available wireless networks before selecting new wireless network 106. For example, a user of the Mac OS™ can temporarily switch the "AirPort" connection to new wireless network 106. (The terms "Macintosh" and "Mac OS" are trademarks or registered trademarks of Apple Computer, Inc. in the United States and other countries.)

Since there is no DHCP server on new wireless network 106, existing wireless device 102 picks itself a link-local address on new wireless network 106 (step 310).

Next, existing wireless device 102 uses DNS Service Discovery (or another appropriate Service Discovery protocol known to those skilled in the art) to discover the list of entities on new wireless network 106 that are awaiting configuration information (step 312).

In order to provide this configuration information, existing wireless device 102 sends packet 200 (illustrated in FIG. 2) to new wireless device 104 through new wireless network 106 (step 314). Recall that packet 200 contains configuration information that allows new wireless device 104 to join existing wireless network 112.

Furthermore, note that sending packet 200 to new wireless device 104 can involve a secure communication so as not to reveal encryption key 203 to an eavesdropper who may be listening in on the communication. A Diffie-Hellman key exchange is one possible solution. However, any appropriate encryption technique can be used to keep the information in packet 200 private.

Upon receiving packet 200, new wireless device 104 stops advertising new wireless network 106 (step 316). New wireless device 104 also uses the information contained in packet 200 to join existing wireless network 112.

Security Measures

New wireless device 104 may implement security measures to ensure that the person configuring the device is in fact the rightful owner of that device, and not just a neighbor who happens to be within wireless range.

For example, (1) new wireless device 104 may require that the configuration packet contains the serial number of the device, which is printed on a label on the back of the device and not otherwise available to a neighbor who does not have physical access to the device. (2) New wireless device 104 may have a physical reset switch, and require that the switch be pressed within five seconds of sending the configuration packet. A neighbor who does not have physical access to the device would not be able to press the reset switch. (3) Moreover, if new wireless device 104 is a printer, when the physical reset switch is pressed it may print a page including a random number that the user must enter into their configuration tool for inclusion in the configuration packet, to prove that the user has physical access to the device.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using reverse advertising to configure a new wireless device to join an existing wireless network, comprising:
   broadcasting a service advertisement from the new wireless device on a new wireless network, wherein the service advertisement can be received by more than one device on the existing wireless network;
   in response to the service advertisement, the new wireless device receiving information from an existing wireless device that is on the existing wireless network, wherein receiving the information from the existing wireless device involves:
      receiving a request to join the new wireless network from the existing wireless device;
      allowing the existing wireless device to join the new wireless network; and
      receiving information from the existing wireless device specifying how to join the existing wireless network;
   wherein the new wireless network and the existing wireless network are different networks;
   wherein the information specifies how to join the existing wireless network and includes a packet which is associated with one or more of: the name of the existing wireless network, encryption key type, encryption key, IP (Internet Protocol) address of the new wireless device, subnet mask, IP gateway address, and DNS (Domain Name System) server address; and
   enabling the new wireless device to join the existing wireless network based on the information.

2. The method of claim 1, wherein broadcasting the service advertisement from the new wireless device involves:
   advertising the new wireless network from the new wireless device; and
   advertising the new wireless device on the new wireless network.

3. The method of claim 2, wherein advertising the new wireless device involves obtaining a link-local address for the new wireless device on the new wireless network.

4. The method of claim 1, wherein allowing the existing wireless device to join the new wireless network involves obtaining a link-local address for the existing wireless device on the new wireless network.

5. The method of claim 1, wherein the method further comprises receiving an encryption key to facilitate secure communications across the existing wireless network.

6. The method of claim 5, wherein receiving the encryption key involves performing a Diffie-Hellman key exchange to ensure that the encryption key is received securely.

7. The method of claim 1,
   wherein the information received from the existing wireless device includes an identifier for a new wireless device; and
   wherein the new wireless device verifies that the identifier matches a valid identifier for the new wireless device to ensure that the existing wireless device is authorized to send configuration information to the new wireless device.

8. A method for using reverse advertising to configure a new wireless device to join an existing wireless network, comprising:
   receiving a service advertisement broadcast from the new wireless device on a new wireless network, wherein the service advertisement can be received by more than one device on the existing wireless network;
   wherein the service advertisement is received at an existing wireless device on the existing wireless network;
   wherein the new wireless network and the existing wireless network are different networks;
   in response to the service advertisement, the existing wireless device sending a request to the new wireless device to join the new wireless network;
   upon receiving an allowance from the new wireless device to join the new wireless network, the existing wireless device joining the new wireless network;
   the existing wireless device sending information to the new wireless device on the new wireless network specifying how to join the existing wireless network;
   wherein the information includes a packet which is associated with one or more of: the name of the existing wireless network, encryption key type, encryption key, IP (Internet Protocol) address of the new wireless device, subnet mask, IP gateway address, and DNS (Domain Name System) server address; and enabling the new wireless device to join the existing wireless network based on the information.

9. The method of claim 8, wherein receiving the service advertisement from the new wireless device involves:
   receiving a service advertisement for the new wireless network from the new wireless device; and
   receiving a service advertisement for the new wireless device on the new wireless network.

10. The method of claim 9, further comprising allowing a user of the existing wireless device to select the new wireless network from a list of available wireless networks prior to sending the request to join the new wireless network.

11. A computer-readable storage medium storing instructions that when executed by a computer cause the computer to perform a method for using reverse advertising to configure a new wireless device to join an existing wireless network, wherein the computer-readable storage medium includes magnetic and optical storage devices, disk drives, magnetic tape, CDs (compact discs), and DVDs (digital versatile discs or digital video discs), the method comprising:

broadcasting a service advertisement from the new wireless device on a new wireless network, wherein the service advertisement can be received by more than one device on the existing wireless network;

in response to the service advertisement, the new wireless device receiving information from an existing wireless device that is on the existing wireless network, wherein receiving the information from the existing wireless device involves:

receiving a request to join the new wireless network from the existing wireless device;

allowing the existing wireless device to join the new wireless network; and receiving information from the existing wireless device on the new wireless network specifying how to join the existing wireless network;

wherein the new wireless network and the existing wireless network are different networks;

wherein the information specifies how to join the existing wireless network and includes a packet which is associated with one or more of: the name of the existing wireless network, encryption key type, encryption key, IP (Internet Protocol) address of the new wireless device, subnet mask, IP gateway address, and DNS (Domain Name System) server address; and enabling the new wireless device to join the existing wireless network based on the information.

12. The computer-readable storage medium of claim 11, wherein broadcasting the service advertisement from the new wireless device involves:

advertising the new wireless network from the new wireless device; and advertising the new wireless device on the new wireless network.

13. The computer-readable storage medium of claim 12, wherein advertising the new wireless device involves obtaining a link-local address for the new wireless device on the new wireless network.

14. The computer-readable storage medium of claim 12, wherein allowing the existing wireless device to join the new wireless network involves obtaining a link-local address for the existing wireless device on the new wireless network.

15. The computer-readable storage medium of claim 11, wherein the method further comprises receiving an encryption key to facilitate secure communications across the existing wireless network.

16. The computer-readable storage medium of claim 15, wherein receiving the encryption key involves performing a Diffie-Hellman key exchange to ensure that the encryption key is received securely.

17. The computer-readable storage medium of claim 15, wherein the information received from the existing wireless device includes an identifier for a new wireless device; and wherein the new wireless device verifies that the identifier matches a valid identifier for the new wireless device to ensure that the existing wireless device is authorized to send configuration information to the new wireless device.

18. A computer-readable storage medium storing instructions that when executed by a computer cause the computer to perform a method for using reverse advertising to configure a new wireless device to join an existing wireless network, wherein the computer-readable storage medium includes magnetic and optical storage devices, disk drives, magnetic tape, CDs (compact discs), and DVDs (digital versatile discs or digital video discs), the method comprising:

receiving a service advertisement broadcast from the new wireless device on a new wireless network, wherein the service advertisement can be received by more than one device on the existing wireless network;

wherein the service advertisement is received at an existing wireless device on the existing wireless network;

wherein the new wireless network and the existing wireless network are different networks;

in response to the service advertisement, the existing wireless device sending a request to the new wireless device to join the new wireless network;

upon receiving an allowance from the new wireless device to join the new wireless network, the existing wireless device joining the new wireless network;

the existing wireless device sending information to the new wireless device on the new wireless network specifying how to join the existing wireless network;

wherein the information includes a packet which is associated with one or more of: the name of the existing wireless network, encryption key type, encryption key, IP (Internet Protocol) address of the new wireless device, subnet mask, IP gateway address, and DNS (Domain Name System) server address; and enabling the new wireless device to join the existing wireless network based on the information.

19. The computer-readable storage medium of claim 18, wherein receiving the service advertisement from the new wireless device involves:

receiving a service advertisement for the new wireless network from the new wireless device; and receiving a service advertisement for the new wireless device on the new wireless network.

20. The computer-readable storage medium of claim 19, wherein the method further comprises allowing a user of the existing wireless device to select the new wireless network from a list of available wireless networks prior to sending the request to join the new wireless network.

21. An apparatus that uses reverse advertising to configure a new wireless device to join an existing wireless network, comprising:

the new wireless device;

a broadcasting mechanism within the new wireless device that is configured to broadcast a service advertisement from the new wireless device on a new wireless network, wherein the service advertisement can be received by more than one device on the existing wireless network;

a receiving mechanism within the new wireless device that is configured to receive information from an existing wireless device that is on the existing wireless network, wherein receiving the information from the existing wireless device involves:

receiving a request to join the new wireless network from the existing wireless device;

allowing the existing wireless device to join the new wireless network; and receiving information from the existing wireless device specifying how to join the existing wireless network;

wherein the new wireless network and the existing wireless network are different networks;

wherein the information specifies how to join the existing wireless network;

wherein the information includes a packet which is associated with one or more of: the name of the existing wireless network, encryption key type, encryption key, IP (Internet Protocol) address of the new wireless device, subnet mask, IP gateway address, and DNS (Domain Name System) server address; and
an enabling mechanism configured to enable the new wireless device to join the existing wireless network based on the information.

22. The apparatus of claim 21, wherein the broadcasting mechanism is configured to:
advertise the new wireless network from the new wireless device; and to
advertise the new wireless device on the new wireless network.

23. The apparatus of claim 21, wherein the receiving mechanism is configured to receive an encryption key to facilitate secure communications across the existing wireless network.

24. The apparatus of claim 23, wherein the receiving mechanism is configured to perform a Diffie-Hellman key exchange to ensure that the encryption key is received securely.

25. The apparatus of claim 23,
wherein the information received from the existing wireless device includes an identifier for the new wireless device; and
wherein the joining mechanism is configured to verify that the identifier matches a valid identifier for the new wireless device to ensure that the existing wireless device is authorized to send configuration information to the new wireless device.

26. An apparatus that uses reverse advertising to configure a new wireless device to join an existing wireless network, comprising:
an existing wireless device on the existing wireless network;
a receiving mechanism within the existing wireless device that is configured to receive a service advertisement broadcast from the new wireless device on a new wireless network, wherein the service advertisement can be received by more than one device on the existing wireless network;
a sending mechanism configured to send a request to the new wireless device to join the new wireless network in response to receiving the service advertisement;
an allowance-receiving mechanism, wherein upon receiving an allowance from the new wireless device to join the new wireless network, the allowance receiving mechanism is configured to join the new wireless network;
an initialization mechanism within the existing wireless device, wherein the new wireless network and the existing wireless network are different networks and
the initialization mechanism is configured to,
send information to the new wireless device on the new wireless network specifying how to join the existing wireless network, and to
enable the new wireless device to join the existing wireless network based on the information; and
wherein the information includes a packet which is associated with one or more of: the name of the existing wireless network, encryption key type, encryption key, IP address of the new wireless device, subnet mask, IP gateway address, and DNS server address.

27. The apparatus of claim 26, wherein the receiving mechanism is configured to:
receive a service advertisement for the new wireless network from the new wireless device; and to
receive a service advertisement for the new wireless device on the new wireless network.

28. The apparatus of claim 27, further comprising a user interface for the existing wireless device that is configured to allow a user of the existing wireless device to select the new wireless network from a list of available wireless networks prior to sending the request to join the new wireless network.

* * * * *